United States Patent [19]

Moore et al.

[11] 3,905,183

[45] Sept. 16, 1975

[54] ASPARAGUS HARVESTER RECEIVING BIN REMOVAL & SUPPORT MEANS

[75] Inventors: Paul J. Moore; Archie E. Neal, both of Garfield, Wash.

[73] Assignee: J. E. Love Company, Garfield, Wash.

[22] Filed: Apr. 29, 1974

[21] Appl. No.: 465,094

[52] U.S. Cl. ............................................. 56/327 A
[51] Int. Cl.² ....................................... A01D 45/00
[58] Field of Search ............ 56/327 A, 13.5; 171/61

[56] References Cited
UNITED STATES PATENTS 3,587,215  6/1971  Porter .............................. 56/327 A
3,717,986  2/1973  Lawson ............................ 56/327 A Primary Examiner—Russell R. Kinsey
Attorney, Agent, or Firm—Graybeal, Barnard, Uhlir & Hughes

[57]  ABSTRACT

An asparagus harvester is disclosed which includes rearwardly projecting support means for carrying a pallet-type crop receiving bin, hinging means connected to the support means, and lifting means for tilting the harvester, thereby permitting easy and rapid removal of a filled receiving bin from the harvester while in the field.

5 Claims, 4 Drawing Figures

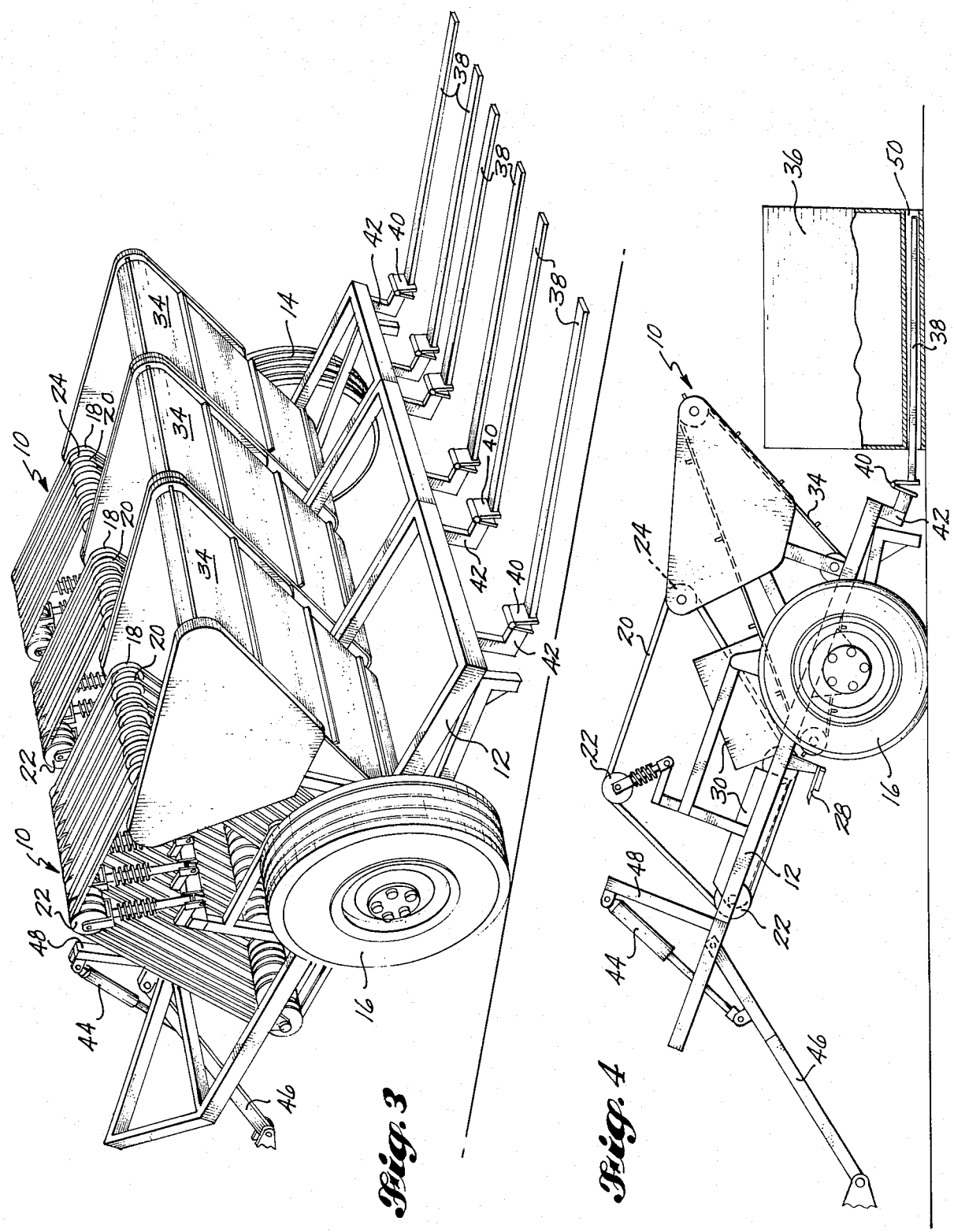

3,905,183

ASPARAGUS HARVESTER RECEIVING BIN REMOVAL & SUPPORT MEANS

BACKGROUND OF THE INVENTION

1. Field of the Invention

The present invention relates to asparagus harvesters. Specifically, the subject invention relates to a means for both supporting and removing from an asparagus harvesting machine a pallet-type receiving bin.

2. Description of the Prior Art

Numerous types of harvesting machines have been developed in the past for cutting and collecting asparagus spears. Examples of such machines are disclosed in U.S. Pat. Nos. 3,066,469; 3,176,456; 3,410,067; 3,412,540; 3,447,292; 3,412,541 and 3,717,986. These patent disclosures are generally concerned with developing more sophisticated harvesting devices for such machines, such as by incorporating sensing devices in the machines for determining the height of the asparagus spears so that only mature spears of a specified height will be cut. In all such harvesting machines, however, the cut asparagus is generally stored in some type of receiving container or bin either attached to or moving with the harvesting machine.

U.S. Pat. Nos. 3,587,215 and 3,760,573 both disclose asparagus harvesters having pallet-type receiving bins which are carried on a plurality of parallel bars behind the harvesting machines. In order to remove a filled receiving bin and replace it with an empty one, both of these disclosed machines require that the parallel support bars be linked directly to hydraulic systems on each machine which lower the bars and supporting structure to the ground, the bars then being pulled out from under the receiving bin. Such systems are unnecessarily expensive and cumbersome. The present invention, however, provides a simplified yet more efficient means for supporting and removing such receiving bins. In addition, the present invention allows ready access to the undercarriage of the asparagus harvester for maintenance purposes without requiring additional equipment or personnel.

SUMMARY OF THE INVENTION

It is, therefore, a primary object of the present invention to provide a simple and economical means for supporting and removing crop receiving bins from an asparagus harvester.

It is yet another object of the present invention to provide a means for ready access to the undercarriage of the asparagus harvester for maintenance purposes.

An asparagus harvester of a type for use with the present invention includes a movable main frame with a plurality of paired gripper belts adapted to move therewithin and grip growing asparagus spears. A cutting blade is located below the frame for severing the asparagus spears subsequent to being gripped between the paired gripper belts. The severed asparagus spears are then released by the gripper belts and dropped onto a conveyor which is located subjacent the gripper belts behind the cutting blade. The conveyor carries the released asparagus spears upwardly and deposits them into a receiving bin which trails behind the asparagus harvester.

In accordance with the present invention, elongated, essentially horizontal support means project rearwardly from the main frame. Self-bracing hinging means secure the support means to the movable frame and permit the projecting support means to pivot freely upwardly from an essentially horizontal position relative to the harvester yet prevent pivoting below the essentially horizontal position. Lifting means located at the forward end of the movable frame raise the forward end of the frame upwardly so as to lower the rearwardly projecting support means toward the ground surface. The pallet-type receiving bin is carried by the support means and has channel means located in the bottom portion thereof which engage the rearwardly projecting support means. When the forward end of the frame is raised and the rearward end lowered, the bottom surface of the receiving bin comes to rest on the ground surface thereby removing its weight from the support means which, due to the self-bracing hinging means, remain in an essentially horizontal position. The asparagus harvester is then moved forwardly to remove the rearwardly projecting support means from the channel means located in the bottom portion of the receiving bin. In this manner, the receiving bin can be easily deposited at any location in the field once it has been filled, an empty bin then being placed on the support means. Furthermore, the lifting means provides ready access to the harvester's undercarriage for maintenance purposes by raising the forward end of the harvester.

BRIEF DESCRIPTION OF THE DRAWINGS

FIG. 3 is a rear perspective view of the plurality of asparagus harvesters shown in FIG. 1 tilted in position for removal of a receiving bin, the guide shields not being shown to more clearly illustrate a typical gripper belt assembly structure of the harvesters; and FIG. 4 is a schematic side view of an asparagus harvester of the present invention with some parts in section, the asparagus harvester being in a position for removal of the receiving bin.

DETAILED DESCRIPTION OF THE PREFERRED EMBODIMENT

Figure 1:
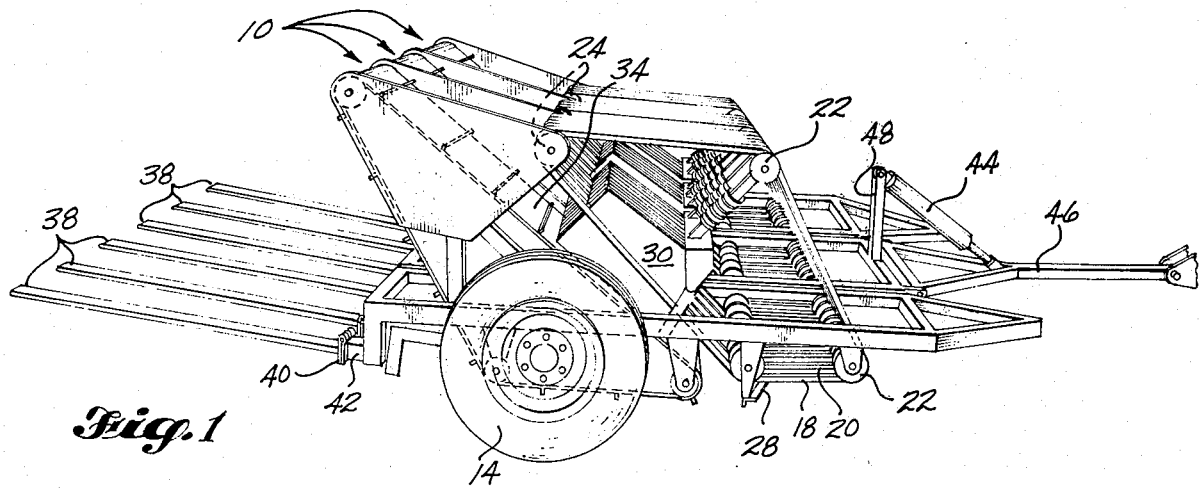
FIG. 1 is a side elevational view of a plurality of asparagus harvesters adapted in accordance with the present invention and secured together side-to-side, with portions of the guide shields not being illustrated in order to more clearly show a typical gripper belt assembly structure of the harvesters.
Figure 2:
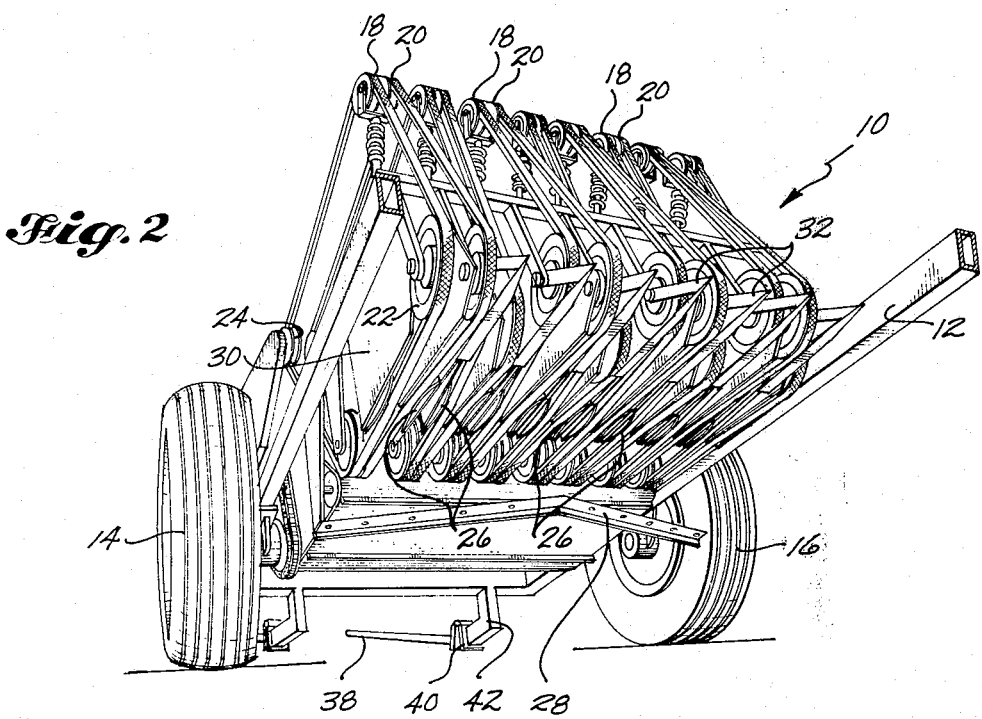
FIG. 2 is a front perspective view of an asparagus harvester showing the undercarriage thereof.

Referring to FIG. 1, there is shown a plurality of asparagus harvesting means secured together in position for harvesting asparagus spears. Each harvesting means 10, in FIGS. 1 and 2, has a main frame 12 which is mounted on wheels 14, 16 for movement over a ground surface. A plurality of paired gripper belts 18, 20 are adapted to move within frame 12 and grip growing asparagus spears. Gripper belts 18, 20 are preferably carried on idler pulleys 22 and moved by drive pulleys 24. Each pair of gripper belts 18, 20 converge together at the undercarriage of harvester 10, as shown in FIG. 2, so as to grip the vertically growing asparagus spears therebetween. Gripper belts 18, 20 are preferably converged together through the use of bias springs 26 at a point just forward of cutting blade 28, which is secured to frame 12 subjacent the plurality of paired gripper belts 18, 20. Guide shields 30 of conventional design, to which springs 26 are secured, are positioned essentially parallel to the plurality of paired gripper belts 18, 20 and are adapted to carry idler pulleys 22 as well as separate each pair of gripper belts 18, 20. Deflector projections 32 are secured to forward portions of guide shields 30 and project outwardly therefrom to guide the growing asparagus spears between the belts of each pair of gripper belts 18, 20.

As asparagus harvester 10 moves forwardly, the vertically growing asparagus spears are directed between the belts of each pair of gripper belts 18, 20 by deflector projections 32 and guide shields 30. Each pair of gripper belts 18, 20 converge together so as to grip the asparagus spears therebetween and hold them in a vertical position for cutting by blade 28. After the asparagus spears have been cut by blade 28, they are carried upwardly between belts 18, 20 until the belts diverge. When the belts diverge, the asparagus spears drop onto conveyor belt 34 which in turn carries the cut asparagus spears upwardly and deposits them in a receiving bin 36 (FIG. 4).

Additional specific details regarding the above described harvesting apparatus and operation are within the skill of the art and are therefore not described herein, reference being made to the prior mentioned U.S. patents. In addition, further details regarding the above are specifically illustrated in the brochure entitled "LOVE Set Level Asparagus Harvester", wherein the Love Harvester Models LL-4 and LL-5 are shown. This brochure is available from the J. E. Love Company, Garfield, Wash.

Referring now to FIGS. 1-4, elongated support means 38 project rearwardly from main frame 12 in an essentially horizontal position relative to frame 12 when harvester means 10 is in operation for harvesting. In preferred form, support means 38 comprises a plurality of elongated, essentially parallel rectangular bars, there being at least two bars 38 projecting from each harvester means 10. In an alternative embodiment not illustrated in the figures, support means 38 may comprise an elongated, flat rectangular plate. Support means 38 is secured to main frame 12 by hinging means 40. In preferred form, each support bar 38 is secured to a bracket 42 by self-bracing hinge 40, bracket 42 being securely welded to frame 12. Each self-bracing hinge 40 is adapted to enable support means 38 to pivot freely upwardly from its essentially horizontal position relative to harvester 10 while preventing pivoting downwardly below the horizontal position so as to be self-bracing with respect to movement below the horizontal position.

Disposed at the forward end of harvester 10, or at the forward end of a plurality of interconnected harvesters 10, is lifting means 44. In preferred form, lifting means 44 is a hydraulic cylinder. One end of hydraulic cylinder 44 is pivotally secured to towing bar 46 which in turn is pivotally secured to both main frame 12 and the towing vehicle (not shown). The other end of hydraulic cylinder 44 is pivotally secured to vertical brace 48, which is securely welded to main frame 12. In this manner, when hydraulic cylinder 44 is extended, the forward end of harvester 10 is raised upwardly while the rearward end is lowered toward the ground surface, as best illustrated in FIGS. 3 and 4.

Receiving bin 36 is carried by support means 38, the bottom portion of bin 36 having a pallet-type configuration. Located in the bottom portion of bin 36 are longitudinal channel means 50 which are sized and shaped to receive the rearwardly projecting support means 38, the height or thickness of the channel means 50 being greater than the thickness of the support means 38. When the support means 38 comprise a plurality of elongated parallel bars, as illustrated in the figures, channel means 50 comprise an equal number of longitudinal parallel channels sized and shaped to enable bars 38 to fit therewithin. These channels may be either grooved recesses in the bottom surface of bin 36, or they may be enclosed channels as illustrated in FIG. 4 which enable the entire bottom surface of bin 36 to contact the ground. In an alternate embodiment (not illustrated), support means 38 may comprise an elongated, flat rectangular plate, with channel means 50 comprising either a large recessed rectangular section in the bottom surface of bin 36, sized and shaped to receive the support plate, or a large hollowed-out rectangular cavity located just above the bottom surface of bin 36.

When asparagus harvester means 10 is in operation, bin 36 is supported by support means 38 and receives the cut asparagus spears. When bin 36 is full, operation of harvester 10 is ceased, and lifting means 44 is used to raise the forward end of the harvester. This maneuver lowers the rearward end of harvester 10 until the bottom surface of bin 36 contacts the ground surface. Hinging means 40 enable support means 38 to rotate freely upwardly relative to harvester 10 as bin 36 is being lowered to the ground surface. In this manner, bin 36 remains in an upright position, and support means 38 remain in an essentially horizontal position. This results in completely transferring the weight of bin 36 from the support means 38 to the ground surface. Once this has been achieved, harvester 10 is merely pulled forwardly to remove support means 38 from channels 50, thereby removing the filled bin 36 from harvester 10. An empty bin 36 is then placed on harvester 10 by inserting support means 38 into the channels 50 of the empty bin.

As can be seen from the above description, the present invention is a simple yet very efficient means of supporting and removing the crop receiving bin of an asparagus harvester. This results in avoiding the more costly and sophisticated equipment and apparatus of the prior art as well as the cost of manual labor. In addition, this invention enables replacement of a filled receiving bin at any location in the asparagus field so that the harvesting operation may continue without undue delay. Furthermore, by raising the forward end of harvester 10 through the use of the present invention, the entire undercarriage of the harvester is readily accessible. This permits easier maintenance of the asparagus harvester, and also enables on the spot repairs in the field by the harvester operator, thereby eliminating the necessity of having to stop harvesting operations to return the harvester to a special location to perform such repairs.

It will be understood that the invention may be embodied in other specific forms without departing from the spirit or central characteristics thereof. The present illustrations and embodiments, therefore, are to be considered in all respects as illustrative and not restrictive, and the invention is not to be limited to the details given herein but may be modified within the scope of the appended claims.

The embodiments of the invention in which an exclusive property or privilege is claimed are defined as follows:

1. In an asparagus harvesting machine comprising a frame mounted for movement over a ground surface, a plurality of paired gripper belts mounted for movement within said frame and adapted to grip growing asparagus spears, a cutting blade positioned subjacent said gripper belts for severing said gripped asparagus spears, conveyor means located below said gripper belts rearwardly of said cutting blade at a point where said gripper belts release said cut asparagus spears and adapted to carry said released asparagus spears upwardly, there being a receiving bin disposed rearwardly of said frame for receiving said cut asparagus spears from said conveyor means, the improvement wherein said asparagus harvesting machine further comprises elongated, essentially horizontal support means projecting rearwardly from said frame, self-bracing hinging means connecting said support means to said frame and adapted to permit said projecting support means to pivot freely upwardly from an essentially horizontal position relative to said frame yet prevent pivotal movement by said support means below said essentially horizontal position, lifting means disposed at the forward end of said frame for raising the forward end of said harvesting machine frame upwardly and lowering said rearwardly projecting support means toward the ground surface, said receiving bin being carried on said rearwardly projecting support means with the bottom portion of said receiving bin having channel means sized and shaped to receive said rearwardly projecting support means.

2. The improvement according to claim 1, wherein said support means comprises a plurality of essentially parallel elongated bars, and said channel means comprises a similar number of longitudinal channels in the bottom portion of said receiving bin for engagement with said rearwardly projecting support bars, said channels having a thickness greater than the thickness of said elongated bars.

3. In an asparagus harvesting machine comprising a frame mounted for movement over a ground surface, a plurality of parallel, spaced-apart guide shields carried by said frame, banks of coaxially arranged pulleys secured to said guide shields, a plurality of paired gripper belts running on said pulleys and adapted to grip growing asparagus spears, deflector projections extending forwardly from said guide shields for guiding said asparagus spears between the belts of each pair of gripper belts, bias springs secured to said guide shields for converging the belts of each pair of gripper belts so as to grip said growing asparagus spears, a cutting blade positioned subjacent said gripper belts for severing said gripped asparagus spears, conveyor means located below said gripper belts rearwardly of said cutting blade at a point where said belts release said cut asparagus spears and adapted to carry said released asparagus spears upwardly, there being a receiving bin disposed rearwardly of said frame for receiving said cut asparagus spears from said conveyor means, the improvement wherein said asparagus harvesting machine further comprises a plurality of brackets secured to the rearward end of said frame, a plurality of essentially parallel, elongated support members projecting rearwardly from said frame, self-bracing hinging means connecting said support members to said brackets and adapted to permit said projecting support members to pivot freely upwardly from their essentially horizontal position relative to said frame yet prevent pivotal movement by said support members below said essentially horizontal position, lifting means disposed at the forward end of said frame for raising the forward end of said harvesting machine frame upwardly and lowering said rearwardly projecting support members toward the ground surface, said receiving bin being carried on said rearwardly projecting support members with said receiving bin having a plurality of longitudinal channels in the bottom portion thereof for receiving said rearwardly projecting support members.

4. The improvement according to claim 3, wherein there are at least two of said essentially parallel elongated support members, wherein said longitudinal channels have a thickness greater than the thickness of said elongated support members, and wherein said lifting means comprises an hydraulic cylinder disposed to tilt the forward end of said frame upwardly and the rearward end of said frame downwardly, thereby enabling the removal of said receiving bin from said elongated support members by the forward movement of said harvesting machine.

5. The improvement according to claim 3, wherein a plurality of said asparagus harvesting machines are secured together side-to-side, wherein at least two of said elongated support members project rearwardly from each of said harvesting machines, and wherein said lifting means comprises an hydraulic cylinder secured to a centrally disposed harvesting machine and adapted to simultaneously tilt the forward ends of said plurality of machines upwardly and the rearward ends thereof downwardly.

* * * * *